United States Patent
Metzler et al.

(10) Patent No.: US 7,260,088 B2
(45) Date of Patent: Aug. 21, 2007

(54) RADIO COMMUNICATION SYSTEM AND METHOD FOR OPERATING

(75) Inventors: Jochen Metzler, Mainz (DE); Thomas Reim, Balzheim (DE)

(73) Assignee: Siemens Aktiengesellschaft, Munich (DE)

( * ) Notice: Subject to any disclaimer, the term of this patent is extended or adjusted under 35 U.S.C. 154(b) by 567 days.

(21) Appl. No.: 10/482,176

(22) PCT Filed: Jun. 14, 2002

(86) PCT No.: PCT/EP02/06595

§ 371 (c)(1),
(2), (4) Date: Jul. 26, 2004

(87) PCT Pub. No.: WO03/003677

PCT Pub. Date: Jan. 9, 2003

(65) Prior Publication Data

US 2004/0242271 A1   Dec. 2, 2004

(30) Foreign Application Priority Data

Jun. 27, 2001  (DE)  ................. 101 31 092
Jun. 27, 2001  (EP)  ................. 01115520

(51) Int. Cl.
*H04L 12/66* (2006.01)
(52) U.S. Cl. ............... 370/352; 370/466; 370/353
(58) Field of Classification Search ........... 370/352, 370/466, 396, 395.64, 410, 522, 338, 349, 370/469, 353–356; 455/428, 557, 560, 422.1
See application file for complete search history.

(56) References Cited

U.S. PATENT DOCUMENTS 5,903,851 A * 5/1999 Backstrom et al. ......... 455/557

(Continued)

FOREIGN PATENT DOCUMENTS

DE    199 35 002 A1    2/2001

(Continued)

OTHER PUBLICATIONS

Valko, et al.; "Voice QoS in Third-Generation Mobile Systems"; IEEE Journal on Selected Areas in Communications, vol. 17, No. 1, Jan. 1999, pp. 109-123.

(Continued)

*Primary Examiner*—Melur Ramakrishnaiah
(74) *Attorney, Agent, or Firm*—Staas & Halsey LLP (57) ABSTRACT

A link established between a first network element that supports connection-oriented links, and a second network element that supports packet-oriented links, by establishing a connection-oriented link between the first network element and a gateway unit, and a packet-oriented link between the second network element and the gateway unit. A first link protocol that is associated with the first network element, and a second link protocol that is associated with the second network element are used. The first link protocol and the second link protocol differ by an information element that contains an address for the packet-oriented link between the second network element and the gateway unit.

14 Claims, 3 Drawing Sheets

U.S. PATENT DOCUMENTS 6,831,913 B1 * 12/2004 Vialen .................. 370/349
2004/0053627 A1    3/2004 Fiter et al.

FOREIGN PATENT DOCUMENTS

| DE | 100 46 342 A1 | 4/2002 |
| WO | 01/13599 | 2/2001 |
| WO | WO 01/13599 A1 | 2/2001 |
| WO | WO 01/33779 A1 | 5/2001 |

OTHER PUBLICATIONS

Dixit et al., "Resource Management and Quality of Service in Third-Generation Wireless Networks"; IEEE Communication Magazine, Feb. 2001; pp. 125-133.

Office Action for German Patent Application No. 101 31 092.7-31 dated May 18, 2006.

Search Report for European Patent Application No. 01115520.7-1249; dated Jan. 28, 2002.

* cited by examiner

RADIO COMMUNICATION SYSTEM AND METHOD FOR OPERATING

CROSS REFERENCE TO RELATED APPLICATIONS

This application is based on and hereby claims priority to German Application No. 10131092.7 and European Application No. 01115520.7 both filed on Jun. 27, 2001, the contents of which are hereby incorporated by reference.

BACKGROUND OF THE INVENTION

Radio communication systems are used for transmitting information, speech or data, with the aid of electromagnetic waves over a radio interface, also called an air interface, between a sending and a receiving radio terminal. Radio communication systems can be subdivided into a core network in which payload and signaling data of a plurality of terminals is transported over long distances on wires and via which a connection can be implemented to a fixed communication network, and into a Radio Access Network (RAN) via which the data received from the terminals is converted into a format suitable for the transmission in the core network and vice versa, the form of data received by the core network is adapted to radio transmission and forwarded to the relevant radio terminal, within the send area in which the terminal involved is located.

Radio communication systems of the first and second generation are currently in use around the world and, because of the great demand for mobile communication, are coming up against the limits of their capacity. The emerging capacity problems are to be resolved by the third-generation radio communication systems. One of the third-generation radio communication systems which shows the greatest promise of success is the Universal Mobile Telecommunication System (UMTS) that was specified by the standardization body 3GPP (Third Generation Partnership Project) (see for example: B. Walke, Mobilfunknetze und ihre Protokolle (Mobile radio networks and their protocols), Volume 1, P. 385-387, Teubner Verlag 2000).

Data is transmitted circuit switched in the UTRAN access network specified for UMTS in accordance with the ATM procedure. In this case the data which is to be transmitted over a connection is subdivided into ATM cells. The timing of ATM cells for a number of connections is interleaved and the cells are transmitted over the same physical connection. The connection channel in this case remains the same for the duration of the transmission. An overview of the ATM method is for example to be found in: B. Walke, Mobilfunknetze und ihre Protokolle (Mobile radio networks and their protocols), Volume 2, Chapter 8, Page 255 to 290, Teubner-Verlag 1998.

The demands on mobile communications are being paralleled by the increased demand for high bandwidth worldwide data communications. This data is communicated over the Internet according to the IP (Internet protocol) procedure. In this case data packets are transported over packet-oriented connections, i.e. connectionless, between the users. With packet-oriented transmission there is a free choice of connection channel between the users only for the transmission of the relevant data packet. A subsequent data packet can be routed via another channel. It is thus possible that the order in which the data packets are received differs from the order in which they were sent.

There is an increasing demand to be able to also transmit large volumes of data by mobile communication with a high bandwidth. An IP-based radio communication network has therefore been proposed (see for example: 3GPP, IP Transport in UTRAN Work Task Technical Report, in 3GPP TR 25.933 2001), in which connections are made using the IP procedure.

SUMMARY OF THE INVENTION

The problem underlying the invention is that of specifying a radio communication system as well as a method of operating the same, which is on the one hand compatible with radio communication systems that support circuit-oriented connections, and on the other hand supports mobile data communications using connectionless communication.

The radio communication system has a first network element that supports circuit-oriented connections and a second network element that supp The first network element and the second network element are connected to each other by an interworking unit. For transmission of data between the first network element and the second network element a circuit-oriented connection is established between the first network element and the interworking unit and a packet-oriented connection between the second network element and the interworking unit. In this case a first connection protocol that is used between the first network element and the interworking unit and a second connection protocol that is used between the second network element and the interworking unit is employed. The first connection protocol and the second connection protocol are distinguished from one another by an information element to activate the interworking unit which contains an address for the packet-oriented connection between the second network element and the interworking unit. In this way the different requirements imposed by the circuit-oriented connection on one side and the packet-oriented connection on the other side are reconciled. The interworking unit represents an intermediate node for data transmission, from which and to which the individual subconnections are established.

The first network element can in this case be both a first access network and also a core network of the radio communication system that supports circuit-oriented connections. The second network element can be both a second access network that supports packet-oriented connections and also, if the first network element is the first access network, a core network that supports packet-oriented connections.

In addition, in a radio communication system with only one access network and a core network, the first network element can be the access network that supports packet-oriented connections and the second network element the core network that supports circuit-oriented connections. Alternatively the access network can support circuit-oriented connections and the core network packet-oriented connections.

Preferably the first connection protocol includes information elements for setting up the circuit-oriented connection between the first network element and the interworking unit. The second connection protocol includes the information elements of the first connection protocol and the information element for activating the interworking unit. The information element for activating the interworking unit contains an address of the second network element, to which the packet-oriented connection with the interworking unit is established. In addition the second connection protocol can contain further information elements.

The connection can be advantageously realized in this case in that the first network element supports ATM connections and the second network element supports IP connections. In this case signaling is exchanged for example in the Radio Network Layer defined in the UMTS Model when a connection is set up which contains the information that will be needed for setting up the ATM connection between the first network element and the interworking unit. This information includes for example: The Transport Layer Address (TLA) and Transport Association (TA). In the Transport Network Layer: the first connection protocol and the second connection protocol are then exchanged.

The connection between the first network element and the interworking unit will preferably be established as an AAL2 connection. The information element for activating the interworking unit that is contained in the second connection protocol includes an IP endpoint identification of the second network element.

Preferably the first connection protocol, with the aid of which the connection between the first network element and the interworking unit is set up, features the information elements according to an ALCAP protocol. The second connection protocol additionally contains an address and a UDP port, to which the packet-oriented connection will be established.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

A radio communication system (see FIG. 1) has a first access network Z1, a second access network Z2 and a core network S. The first access network Z1 has base station nodes B1 which are connected via an Iub interface with a radio network controller RNC1. The first access network Z1 supports ATM-based connections.

Figure 1:
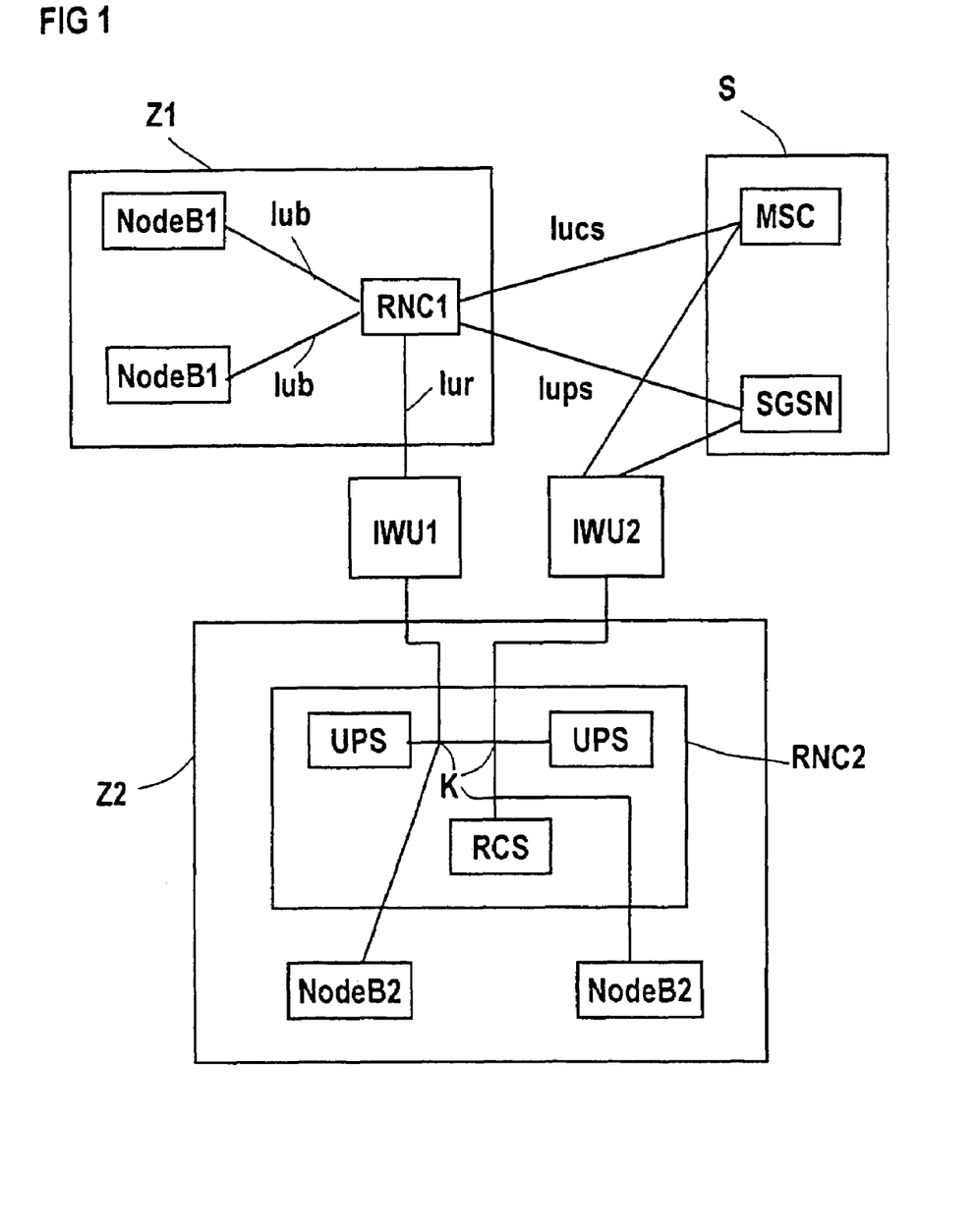
FIG. 1 is a block diagram of a radio communication system in accordance with the invention.

The second access network Z2 has a number of base stations NodeB2. The base stations NodeB2 are connected to a radio network controller RNC2. The radio network controller RNC2 has one or more user plane servers UPS and one or more radio control servers RCS that are connected to each other via node K. The radio control server RCS takes over the control and monitoring of the air interface, as well as of the radio resources, while the user plane server UPS takes over transmission of the payload data. This type of division of the payload data and the signaling data was for example: proposed in German Patent Application P 100 46 342.8-31. The second access network Z2 supports IP-based connections.

The radio network controller RNC1 is connected via an interface Iur with a first interworking unit IWU1. The first interworking unit IWU1 is connected on the other side with the second access network Z2. The connection is for example realized via node K of the radio network controller RNC2.

In addition, Radio Network Controller RNC1 is connected via an interface Iucs with the Mobile Switching Center MSC of the core network and via an interface Iups for packet-switching data with a packet data node SGSN of the core network S. The core network S supports ATM-based connections.

The radio network controller RNC2 is connected via a second interworking unit IWU2 of the second access network Z2 with the core network S.

To set up a data connection between the first access network Z1 and the second access network Z2 or between the second access network Z2 and the core network S an ATM-based connection between the second access network Z2 and the interworking unit IWU1 or IWU2 is set up in each case and a further ATM-based connection between the interworking unit IWU1 and the first access network Z1 or the interworking unit IWU2 and the core network S.

Figure 2:
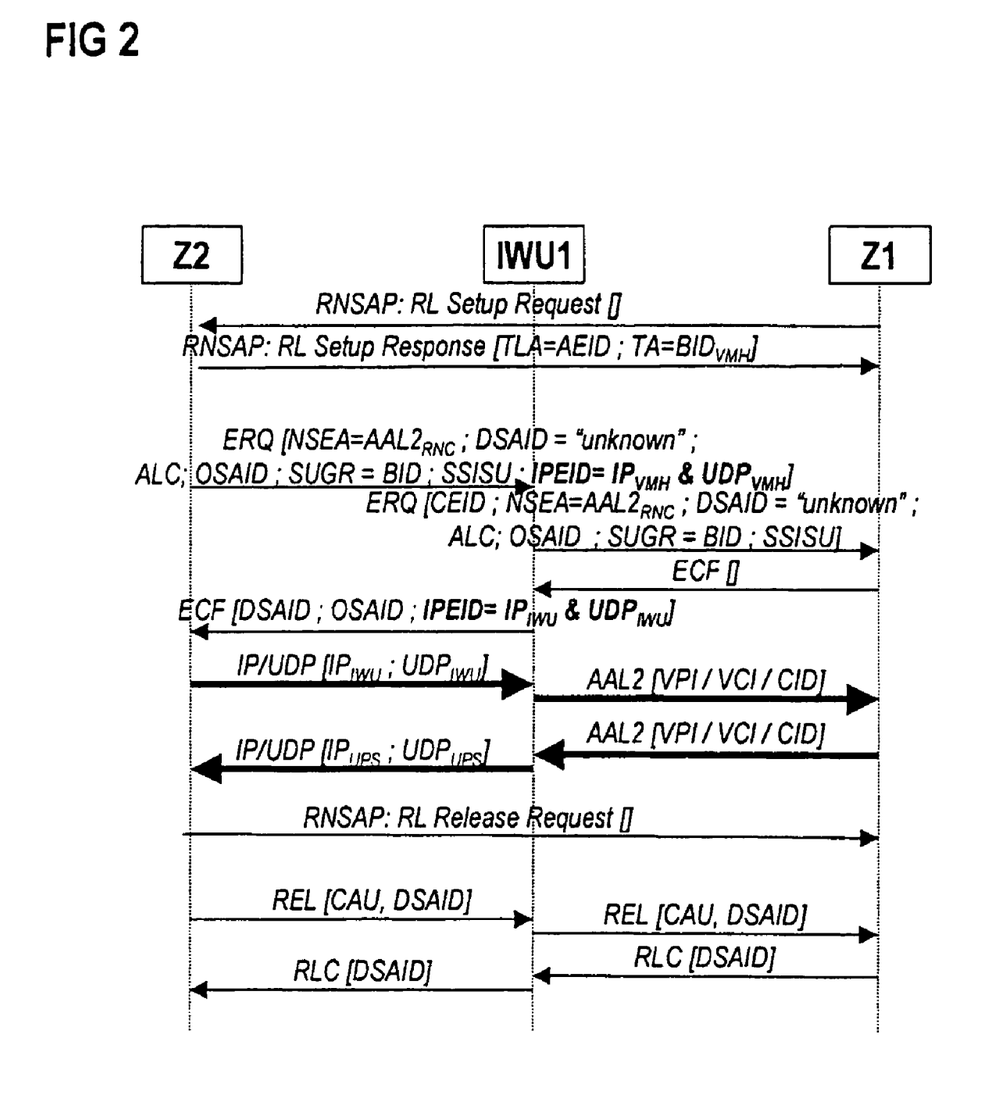
FIG. 2 is a transmission sequence diagram of connection setup, data transmission and connection cleardown between an IP-based and an ATM-based access network.

To set up a connection between the first access network Z1 and the second access network Z2 an RL Setup Request will be sent transparently for the interworking unit IWU1 from the radio network controller RNC1 of the first access network Z1 to the radio network controller RNC2 of the second access network Z2 (see FIG. 2). There follows an RL Setup Response). With this response the connection parameters TLA and TA will be transmitted.

Subsequently the connection will be set up via the transport network controller. To do this the radio network controller RNC2 of the second access network Z2 will send an Establishment Request ERQ) to the interworking unit IWU1. This signaling message contains the arguments NSEA for destination NSAP Service endpoint address, DSAID for Destination signaling association identifier, ALC for Link characteristics, OSAID for Originating signaling association identifier, SUGR for Served user generated reference, SSISU for Service specific Information (SAR-unassured) as well as IPEID that contains an address of the radio network controller RNC2 to which a connection from the interworking unit IWU1 to the radio network controller RNC2 is to be set up. In this case NSAP stands for Network Service Access Point and SAR for Segmentation and Reassembly (Sublayer).

Between the interworking unit IWU1 and the first access network Z1 a signaling message Establishment Request ERQ) will be sent. In this case the parameter CEID stands for Connection Element Identifier. The remaining parameters are taken from the signaling message between the second access network Z2 and the interworking unit IWU1.

The first access network Z1 responds to the interworking unit with an Establishment Confirm ECF. The interworking unit responds to the second access network Z2 with an Establishment Confirm). In this signaling message the second access network Z2 is notified about an address of the interworking unit IWU1 to which the connection is to be set up.

Thus the connection from the second access network Z2 to the interworking unit IWU1 and from the interworking unit IWU1 to the first access network Z1 and vice versa is established. Payload data, shown by the black arrows, is transmitted. The payload data will be transmitted between the second access network Z2 and the interworking unit IWU1 over a IP/UDP connection. Between the interworking unit IWU1 and the first access network Z1 the payload data will be transmitted over an ATM-based AAL2 connection.

After the end of data transmission the connection will be cleared down again. To do this an RL Release Request for the interworking unit will be exchanged transparently between the access network Z2 and the first access network Z1. The clear down of the connection between the second access network and interworking unit IWU1, as well as between the interworking unit IWU1 and the first access network Z1 follows.

Figure 3:
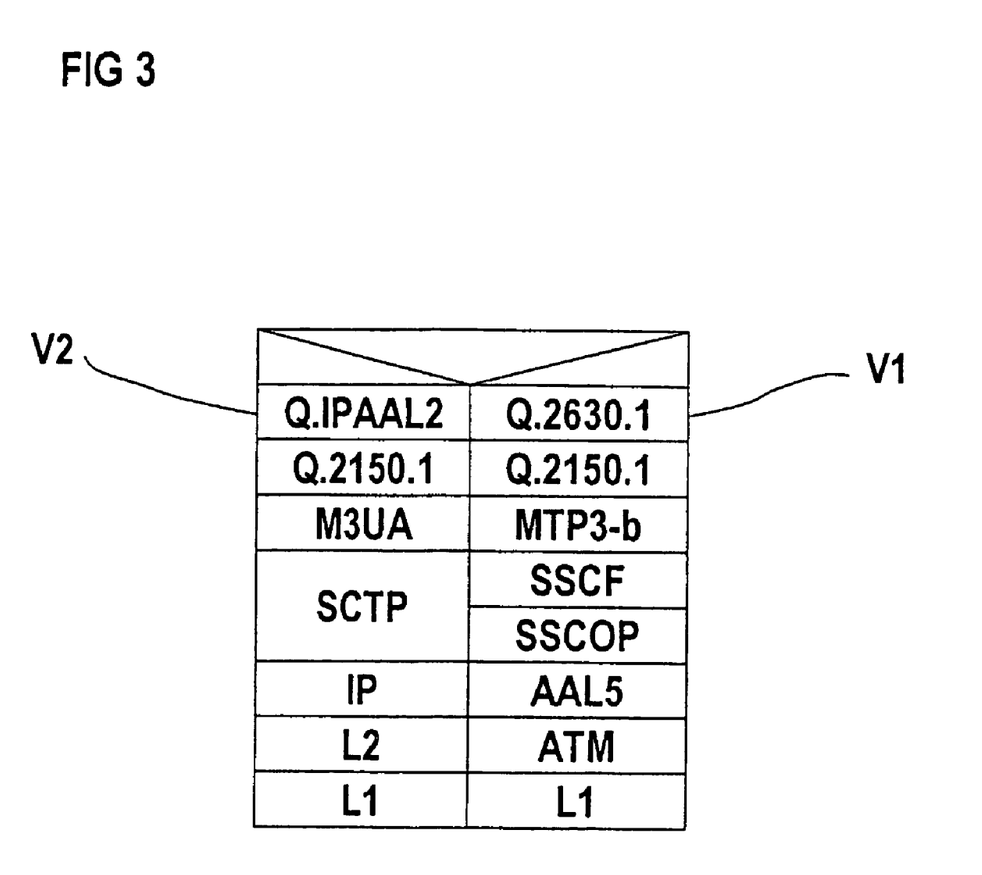
FIG. 3 is a table of protocols used for establishing the connection between the IP-based and ATM-based access network.

In FIG. 3 the protocols used for this are shown. In the uppermost layer a first connection protocol V1 is used for the first access network and a second connection protocol V2 is used for the second access network. The first connection protocol V1 is the protocol standardized under the designation Q.2630.1 or ALCAP for setting up ATM-based connections. The second connection protocol V2 contains the information elements listed in the first connection protocol V1 and in addition contains an IP endpoint identification which allows the connection between the second access network Z2 and interworking unit IWU to be set up.

The clear down of a connection between the second access network Z2 and the core network S via the second interworking unit IWU2 uses the same procedures.

The invention has been described in detail with particular reference to preferred embodiments thereof and examples, but it will be understood that variations and modifications can be effected within the spirit and scope of the invention.

The invention claimed is:

1. A radio communication system, comprising:
   an interworking unit;
   a first network element supporting circuit-oriented connections and using a first connection protocol to set up a circuit-oriented connection with said interworking unit; and
   a second network element supporting packet-oriented connections and using a second connection protocol to set up a packet-oriented connection with said interworking unit for interconnection with said first network element via said interworking unit, the second connection protocol being distinguished from the first connection protocol by an activating information element in the second network protocol for activating the interworking unit which contains an address for the packet-oriented connection between said second network element and said interworking unit.

2. The radio communication system according to claim 1, further comprising
   a core network;
   a first access network; and
   a second access network,
   wherein said first network element is part of said first access network, and
   wherein said second network element is part of one of said second access network and said core network.

3. The radio communication system according to claim 1, further comprising
   a core network;
   a first access network; and
   a second access network,
   wherein said first network element is part of said core network, and
   wherein said second network element is part of said second access network.

4. The radio communication system according to claim 1, wherein the first connection protocol includes circuit-oriented information elements for setting up the circuit-oriented connection between said first network element and said interworking unit,
   wherein the second connection protocol contains the circuit-oriented information elements of the first connection protocol and the activating information element, and
   wherein the activating information element contains an address of said second network element to which the packet-oriented connection with said interworking unit is set up.

5. The radio communication system according to of the claim 4,
   wherein said first network element supports ATM-connections, and
   wherein said second network element supports IP connections.

6. The communication system according to claim 5,
   wherein the circuit-oriented connection between said first network element and said interworking unit is set up as an AAL2 connection, and
   wherein the activating information element contains an IP endpoint identification of said second network element.

7. The radio communication system according to claim 6,
   wherein the first connection protocol includes an ALCAP information element in accordance with an ALCAP protocol, and
   wherein the second connection protocol contains also includes a UDP port, to which the packet-oriented connection can be set up.

8. A method for operating a radio communication system, comprising:
   establishing a circuit-oriented connection between a first network element and an interworking unit using a first connection protocol assigned to the first network element;
   establishing a packet-oriented connection between a second network element and the interworking unit using a second connection protocol assigned to the second network element; and
   distinguishing between the first and second connection protocols by an activating information element in the second connection protocol that contains an address for activation of the interworking unit for the packet-oriented connection between the second network element and the interworking unit.

9. The method according to claim 8,
   wherein the radio communication system includes a core network, a first access network, and a second access network,
   wherein the first network element is part of the first access network, and
   wherein the second network element is part of one of the second access network and the core network.

10. The method according to claim 8,
    wherein the radio communication system includes a core network, a first access network, and a second access network,
    wherein the first network element is part of the core network, and
    wherein the second network element is part of the second access network.

11. The method according to claim 8,
    wherein the first connection protocol includes circuit-oriented information elements for setting up the circuit-oriented connection between the first network element and the interworking unit, wherein the second connection protocol contains the circuit-oriented information elements of the first connection protocol and the activating information element, and wherein the activating information element contains an address of the second network element to which the packet-oriented connection with the interworking unit is set up.

12. The method according to claim 11, wherein the first network element supports ATM-connections, and wherein the second network element supports IP connections.

13. The method according to claim 12, wherein the connection between the first network element and interworking unit is set up as an AAL2 connection, and wherein the activating information element contains an IP endpoint identification of the second network element.

14. The method according to claim 13, wherein the first connection protocol includes an ALCAP information element in accordance with an ALCAP protocol, and wherein the second connection protocol contains also includes a UDP port, to which the packet-oriented connection can be set up.

* * * * *

UNITED STATES PATENT AND TRADEMARK OFFICE
CERTIFICATE OF CORRECTION

PATENT NO. : 7,260,088 B2
APPLICATION NO. : 10/482176
DATED : August 21, 2007
INVENTOR(S) : Jochen Metzler et al.

Page 1 of 1

It is certified that error appears in the above-identified patent and that said Letters Patent is hereby corrected as shown below:

Column 2, Line 17, change "supp" to --supports packet-oriented connections.--.

Column 4, Line 30, after "Response" change ")." to --(TLA=AEID;TA=BIDvmH).--.

Column 4, Line 35, change "ERQ)" to --ERQ(NSEA=AAL2RNC;DSAID="unknown"; ALC;OSAID;SUGR=BID;SSISU;IPEID=IPVMH & UDPVMH)--.

Column 4, Line 50, change "ERQ)" to --ERQ(CEID;NSIA=AAL2RNC;DSAID="unknown";ALC;OSAID;SUGR=BID; SSISU)--.

Column 4, Line 57, change "Confirm)." to --Confirm (DSAID;OSAID;IPEID=IPIWU and UDPIWU).--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,260,088 B2
APPLICATION NO. : 10/482176
DATED : August 21, 2007
INVENTOR(S) : Jochen Metzler et al.

Page 1 of 1

It is certified that error appears in the above-identified patent and that said Letters Patent is hereby corrected as shown below:

Column 2, Line 17, change "supp" to --supports packet-oriented connections.--.

Column 4, Line 30, after "Response" change ")." to --(TLA=AEID;TA=BIDvmH).--.

Column 4, Line 35, change "ERQ)" to --ERQ (NSEA=AAL2RNC;DSAID="unknown";ALC;OSAID;SUGR=BID;SSISU;IPEID=IPVMH & UDPVMH)--.

Column 4, Line 50, change "ERQ)" to --ERQ (CEID;NSIA=AAL2RNC;DSAID="unknown";ALC;OSAID;SUGR=BID;SSISU)--.

Column 4, Line 57, change "Confirm)." to --Confirm (DSAID;OSAID;IPEID=IPIWU and UDPIWU).--.

Signed and Sealed this

First Day of April, 2008

JON W. DUDAS
*Director of the United States Patent and Trademark Office*